Patented Jan. 26, 1954

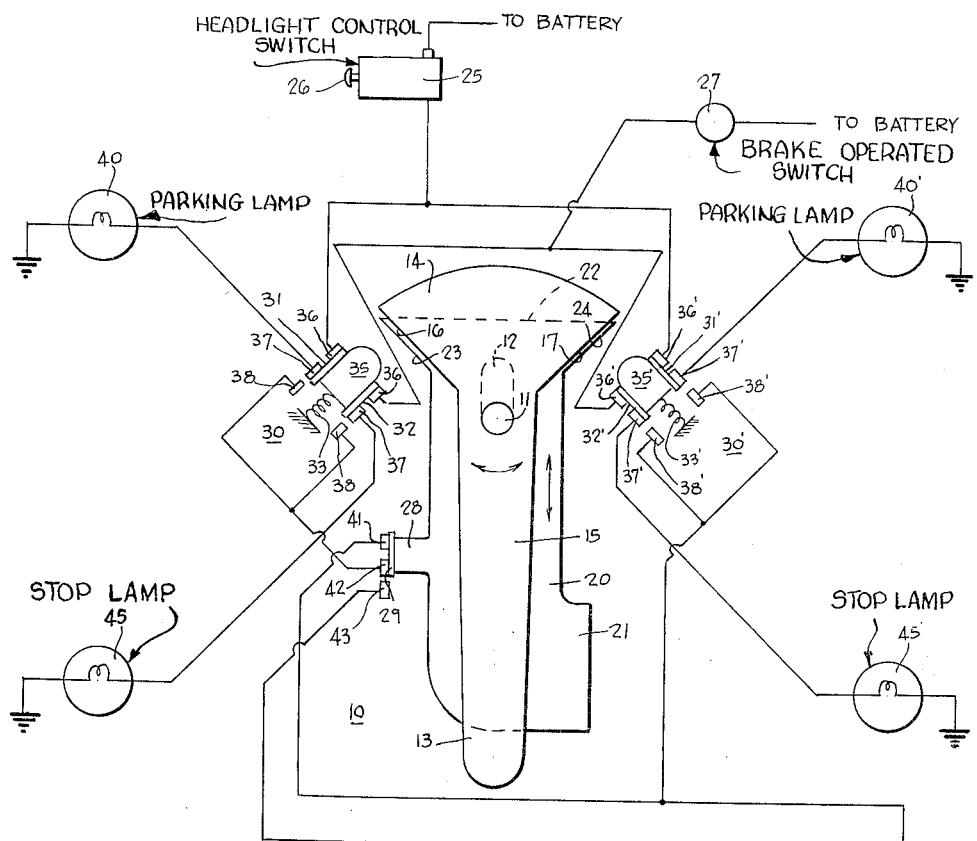

2,667,627

UNITED STATES PATENT OFFICE 2,667,627

VEHICLE DIRECTIONAL AND EMERGENCY PARKING SIGNAL CONTROL SYSTEM

Jesse R. Hollins, Brooklyn, N. Y.

Application December 1, 1951, Serial No. 259,474

7 Claims. (Cl. 340—81)

This invention relates to signal lamp circuits for motor vehicles and, more particularly, to a novel directional signalling switch in combination with novel signal lamp and flasher circuits.

Modern motor vehicles are equipped with two pairs of lamps for signalling changes in direction, one pair being mounted on either side of the front of the vehicle and the other pair on either side of the rear of the vehicle. A selector switch is provided to selectively energize both left lamps or both right lamps, preferably in circuit with a flasher to "flash" the selectively illuminated lamps. Frequently, the parking and tail lamps of the vehicle are used as the signal lamps.

The flasher generally includes a resistance wire which is always in circuit and which is periodically shunted by operation of a movable switch arm responsive to heating of the resistance wire. This arm makes alternate contacts with two terminals. When the resistance wire is not shunted, its high resistance prevents any effective current flow to the signal lamps, so that the lamps are energized only when the resistance wire is shunted by the movable flasher arm. When the latter shunts the resistance wire, the wire cools and the flasher arm disengages the shunting contact. An indicating pilot lamp is usually associated with the signal lamps and energized through a relay which closes its contacts each time the lamps are energized by the flasher.

The signalling lamps on either side of the vehicle are selectively energized, in the usual case, by a swinging selector lever. When separate signal lamps are provided, a switch operated by this lever connects the selected lamps (right or left) to the source of electric energy through the flasher. When the parking and tail or stop lamps double as the signal lamps, the switch normally connects these lamps to respective switches. When the selector lever is operated, the switch disconnects the selected lamps from their control switches and connects them to the battery through the flasher. In either case, a flashing "right turn" or "left turn" signal is provided.

In accordance with the present invention, a novel signalling control arrangement is provided including a swingable selector arm for selectively signalling a turn and an additional "flare" arm for simultaneously flashing all the signal lamps either in synchronism or in alternation. As the load of all the lamps, if imposed simultaneously on the flasher, would overload the flasher contacts and shorten its life, the invention control includes a novel circuit arrangement whereby the signal lamp load is divided into two equal parts, only one of which draws its current through the main flasher contacts. Thus, even with all lamps being flashed at once, the flasher contacts carry only their normal design load.

For an understanding of the invention principles, reference is made to the following detailed description of typical embodiments thereof as illustrated in the accompanying drawing. In the drawing, the single figure is a schematic wiring diagram of a vehicle signal lamp circuit embodying the invention control arrangement.

Referring to the drawing, the invention is illustrated, by way of example only, as incorporated in a signalling system of the type in which the vehicle parking and stop lamps are also used as turn signalling lamps. The control switch 10, which in practice is mounted on a suitable base or enclosed in a suitable housing is provided with a swingably mounted selector lever 15 controlling the turn signalling and a reciprocably mounted "flare" lever 20 operable to flash all the signal lamps at once.

Lever 15 may be swingably mounted on a pivot pin or shaft 11 which also extends through an elongated slot 12 in lever 20 permitting longitudinal reciprocation of the latter. Lever 15 includes an elongated operating handle 13 and an enlarged switch operating head 14 which is preferably substantially sector-shaped about pin 11 as a center and includes switch operating or camming surfaces 16 and 17.

Lever 20 may be normally spring biased to the position shown or may be merely releasably latched in either extreme position. This lever has a lateral offset 21 at its lower end which may be grasped by the operator to operate the "flare" control. At its opposite end, lever 20 has a substantially triangular operating head 22 with switch operating or camming surfaces 23, 24 substantially parallel, respectively, to surfaces 16 and 17 of lever 15.

On either side of levers 20 and 15 are the signalling control switches 30 and 30', which are identical in construction so that only one will be described in detail. Switch 30 includes a longitudinally reciprocable operator 35 aligned for movement perpendicularly to surface 23 of head 22 and carrying contact strips 31, 32 on either side. A spring 33 biases operator 35 toward surfaces 16 and 23. Three pairs of contacts 36, 37 and 38 are arranged for selective interconnection by contact strips 31, 32.

One outer contact 36, 36' of each switch is connected to headlamp control switch 25 which, in turn, is connected to the vehicle battery and generator. When the operating knob 26 of switch 25 is in the "parking lamps" position, these two switch contacts 36, 36' are "live." The other outer contacts 36, 36' are connected in parallel to the stop light switch 27 which is usually brake pedal operated and is connected to the battery and generator.

One of each pair of intermediate contacts 37, 37' is connected to a different grounded parking lamp 40 (left) or 40' (right). Each other intermediate contact 37, 37' is connected to a different grounded stop lamp 45 (left) or 45' (right).

An abutment 28 on one side of "flare" lever 20 carries a contact strip 29 cooperable with three contacts 41, 42, 43. Contact 41 is connected in parallel to innermost contacts 38', 38', and contact 42 to innermost contacts 38, 38. Contacts 41 and 43 are individually connected, in a novel manner, to a flasher 50 connected through a fuse 44 to the grounded vehicle battery 46 (which is in parallel with the vehicle generator).

The flasher 50 has a movable contact arm 51 which is normally biased out of engagement with a main flasher contact 52 by means including a high resistance wire 53. Wire 53 is connected between flasher terminals 54 and 56, terminal 54 being connected to fuse 44 and terminal 56 to main contact 52. The latter is connected, in series, with the operating coil 56 of a pilot lamp relay 55, to contact 41. The arm 57 of relay 55 is normally disengaged from a relay contact 58 connected to a grounded pilot or indicator lamp 60.

For a purpose to be described, the stop 61 for flasher arm 51 is provided with an auxiliary or back flasher contact 62 and is connected to switch contact 43. Relay arm 57 is connected to main contact 52. When any of the lamps are connected in circuit, current flows through wire 53 which heats and lengthens to snap arm 51 away from back contact 61 and into engagement with main contact 52. Before such arm movement, the lamps which may be connected to back contact 62 are illuminated, but those which may be connected to main contact 52 are not, as the resistance of wire 53 is sufficiently high to prevent current flow adequate to light the latter lamps. When arm 51 engages contact 52, wire 53 is shunted, cools and contracts to reengage arm 51 with back contact 61. Relay 55 closes to light lamp 60 when arm 51 engages contact 52.

As will be made clear hereinafter, when a turn in either direction is signalled by operating lever 15, the selected lamps are connected to main contact 52. When flare lever 20 is operated, lamps 40, 45 are connected to back contact 62 and lamps 40', 45' to main contact 52. Thus, the right and left lamps are flashed in alternation when all four lamps are energized.

In the switch position shown in the drawing, the parking lamps are connected to headlamp control switch 25 through contacts 36, 37 and strip 31, and contacts 36', 37' and strip 31'. Similarly, the stop lamps are connected to switch 27 through the outer and intermediate contacts engaged by strips 32, 32'.

To signal a left turn, selector lever 15 is swung counter-clockwise, so that surface 16 of head 14 engages operator 35 and moves it inwardly to disengage contacts 36 and connect contacts 37 to contacts 38. Lamps 40, 45 are now connected to flasher 50 through contacts 37, strips 31, 32, contacts 38, contact 42, strip 29, contact 41, relay coil 56 and main contact 52. The left lamps 40, 45 are thus flashed in synchronism with pilot lamp 60. The right lamps 40', 45' may be similarly flashed by swinging lever 15 clockwise, the contacts 38, 38' being directly connected to contact 41.

To flash all the lamps at once as warning "flares" for an emergency stop or parking, lever 20 is pulled by grasping abutment 21. Strip 29 disconnects contact 42 from contact 41 and interconnects contacts 42 and 43. Surfaces 23 and 24 on head 22 move operators 35, 35' to disengage the outer pair of contacts 36, 36' and connect the intermediate contacts 37, 37' to the corresponding inner contacts 38, 38'.

Lamps 40, 45 are connected to fuse 44 through contacts 37, strips 31, 32, contacts 38, contact 42, strip 29, contact 43, stop 61, back flasher contact 62, flasher arm 51 and terminal 54. These lamps light immediately, but are extinguished when wire 53 heats to engage arm 51 with main flasher contact 52. Lamps 40', 45' are now connected to fuse 44 through contacts 37', strips 31', 32', contacts 38', relay coil 56, main contact 52, arm 51, and terminal 54. Relay 55 closes so that pilot lamp 60 flashes in synchronism with lamps 40', 45'.

Due to the provision of auxiliary or back flasher contact 62, the right and left lamps are flashed in alternation. Also, only one set of lamps is energized through arm 51 and contact 52 at any one time. Thus, the contact 52 is not overloaded, as would occur were all lamps energized through this one contact. Shortening of the flasher life is thus prevented.

The invention arrangement thus provides for normal operation of the headlamps and stop lamps, selective flashing of either set as turn indicators, and alternating flashing of both sets of flares, the latter being effected without overloading the flasher main contact, due to the provision of back contact 62 and its circuit connections.

Should independent signal lamps be provided, the described and illustrated arrangement is modified by omitting the circuit connections to headlamp control switch 25 and stop lamp switch 27, otherwise operating exactly as described herein.

While a specific embodiment of the invention has been shown and described in detail to illustrate the application of the invention principles thereof, it should be understood that the invention may be otherwise embodied without departing from such principles.

What is claimed is:

1. A motor vehicle signalling control comprising a pair of switches mounted in spaced relation to each other, each switch including a first pair of contacts each connectible to a signal lamp on one side of the vehicle, a second pair of contacts, and an operator normally engaged with said first pair of contacts and movable to a second position interconnecting each of the first pair of contacts to a corresponding contact of the second pair; a flasher connected to the vehicle electric energy source having a main, normally open contact and a normally closed auxiliary back contact; a relay associated with said flasher and operable when said main contact is closed, said relay having an armature and a front contact normally disengaged by said armature; a grounded indicator lamp connected to said front contact; means connecting said armature to said main contact; a selector lever movably mounted between said switches and operable to selectively engage either switch operator to move the same to said second position; a flare lever movably mounted between said switches and selectively operable to engage both switch operators simultaneously to move both thereof to said second position; and switch means associated with and operable by said flare lever and connected to each of said second pairs of contacts, said flasher main contact in series with the operating coil of said relay and to said flasher back contact; said switch means, in the non-operated position of said flare lever, connecting both of said second pairs of contacts to said flasher main contact and, in the selectively operated position of said flare lever, connecting one pair of second contacts to said flasher main contact and the other pair of second contacts to said flasher back contact; whereby, when said selector lever is selectively operated, the signal lamps on one side of the vehicle will be flashed through said main flasher contact and when said flare lever is selectively operated, the signal lamps on one side of the vehicle will be flashed through said main flasher contact and the signal lamps on the other side of the vehicle will be flashed through said flasher back contact in alternation with the lamps on such one side; said pilot lamp being flashed, whenever the selector lever is operated, in synchronism with the signal lamps and being flashed, whenever the flare lever is operated, in synchronism with the signal lamps on one side only of the vehicle.

2. A motor vehicle signalling control comprising a pair of switches mounted in spaced relation to each other, each switch including a first pair of contacts each connectible to a signal lamp on one side of the vehicle, a second pair of contacts, and an operator normally engaged with said first pair of contacts and movable to a second position interconnecting each of the first pair of contacts to a corresponding contact of the second pair; a flasher connected to the vehicle electric energy source having a main, normally open contact and a normally closed auxiliary back contact; a relay associated with said flasher and operable when said main contact is closed, said relay having an armature and a front contact normally disengaged by said armature; a grounded indicator lamp connected to said front contact; means connecting said armature to said main contact; a selector lever swingably mounted on a pivot intermediate said switches and operable to selectively engage either switch operator to move the same to said second position; a flare lever mounted for reciprocation in alignment with said pivot and intermediate said switches and selectively operable to engage both switch operators simultaneously to move both thereof to said second position; and switch means associated with and operable by said flare lever and connected to each of said second pairs of contacts, said flasher main contact in series with the operating coil of said relay and to said flasher back contact; said switch means, in the non-operated position of said flare lever, connecting both of said second pairs of contacts to said flasher main contact and, in the selectively operated position of said flare lever, connecting one pair of second contacts to said flasher main contact and the other pair of second contacts to said flasher back contact; whereby when said selector lever is selectively operated, the signal lamps on one side of the vehicle will be flashed through said main flasher contact and when the flare lever is selectively operated, the signal lamps on one side of the vehicle will be flashed through said main flasher contact and the signal lamps on the other side of the vehicle will be flashed through said flasher back contact in alternation with the lamps on such one side; said pilot lamp being flashed, whenever the selector lever is operated, in synchronism with the signal lamps and being flashed, whenever the flare lever is operated, in synchronism with the signal lamps on one side only of the vehicle.

3. A motor vehicle signalling control comprising a pair of switches mounted in spaced relation to each other, each switch including a first pair of contacts each connectible to a signal lamp on one side of the vehicle, a second pair of contacts, and an operator normally engaged with said first pair of contacts and movable to a second position interconnecting each of the first pair of contacts to a corresponding contact of the second pair; a flasher connected to the vehicle electric energy source having a main, normally open contact and a normally closed auxiliary back contact; a relay associated with said flasher and operable when said main contact is closed, said relay having an armature and a front contact normally disengaged by said armature; a grounded indicator lamp connected to said front contact; means connecting said armature to said main contact; a selector lever swingably mounted on a pivot intermediate said switches and including an operating handle and a head having camming surfaces selectively engageable with either switch operator to move the same to said second position; a flare lever mounted for reciprocation in alignment with said pivot and intermediate said switches and including a head having camming surfaces aligned with said operators, said flare lever being selectively operable to engage both its camming surfaces simultaneously with said operators to move both operators to said second position; and switch means associated with and operable by said flare lever and connected to each of said second pairs of contacts, said flasher main contact in series with the operating coil of said relay and to said flasher back contact; said switch means, in the non-operated position of said flare lever, connecting both of said second pairs of contacts to said flasher main contact and, in the selectively operated position of said flare lever, connecting one pair of second contacts to said flasher main contact and the other pair of second contacts to said flasher back contact; whereby, when said selector lever is selectively operated, the signal lamps on one side of the vehicle will be flashed through said main flasher contact and when said flare lever is selectively operated, the signal lamps on one side of the vehicle will be flashed through said main flasher contact and the signal lamps on the other side of the vehicle will be flashed through said flasher back contact in alternation with the lamps on such one side; said pilot being flashed, whenever the selector lever is operated, in synchronism with the signal lamps and being flashed, whenever the flare lever is operated, in synchronism with the signal lamps on one side only of the vehicle.

4. A motor vehicle signalling control comprising a pair of switches mounted in spaced relation to each other, each switch including a first pair of contacts each connectible to a signal lamp on one side of the vehicle, a second pair of contacts, and an operator normally engaged with said first pair of contacts and movable to a second position interconnecting each of the first pair of contacts to a corresponding contact of the second pair; a flasher connected to the vehicle electric energy source having a main, normally open contact and a normally closed auxiliary back contact; a relay associated with said flasher and operable when said main contact is closed, said relay having an armature and a front contact normally disengaged by said armature; a grounded indicator lamp connected to said front contact; means connecting said armature to said main contact; a selector lever movably mounted between said switches and operable to selectively engage either switch operator to move the same to said second position; a flare lever movably mounted between said switches and selectively operable to engage both switch operators simultaneously to move both thereof to said second position; and a contact strip extending along said flare lever parallel to the latter's direction of reciprocation, and selectively engageable with first, second and third aligned contacts, said strip normally interconnecting said first and second contacts and, in the selectively operated position of said flare lever, interconnecting only said second and third contacts; said first contact being connected in parallel to the second pair of contacts of one switch and to said flasher main contact in series with the relay operating coil, said second contact being connected to the second pair of contacts of the other switch, and said third contact being connected to said relay front contact; whereby, when said selector lever is selectively operated, the signal lamps on one side of the vehicle will be flashed through said flasher main contact and, when said flare lever is selectively operated, the signal lamps on one side of the vehicle will be flashed through said flasher main contact and the signal lamps on the other side of the vehicle will be flashed through said flasher back contact in alternation with the lamps on such one side; said pilot lamp being flashed, whenever the selector lever is operated, in synchronism with the signal lamps and being flashed, whenever the flare lever is operated, in synchronism with the signal lamps on one side only of the vehicle.

5. A motor vehicle signalling control comprising a pair of switches mounted in spaced relation to each other, each switch including a first pair of contacts each connectible to a signal lamp on one side of the vehicle, a second pair of contacts, and an operator normally engaged with said first pair of contacts and movable to a second position interconnecting each of the first pair of contacts to a corresponding contact of the second pair; a flasher connected to the vehicle electric energy source having a main, normally open contact and a normally closed auxiliary back contact; a relay associated with said flasher and operable when said main contact is closed, said relay having an armature and a front contact normally disengaged by said armature; a grounded indicator lamp connected to said front contact; means connecting said armature to said main contact; a selector lever swingably mounted on a pivot intermediate said switches and operable to selectively engage either switch operator to move the same to said second position; a flare lever mounted for reciprocation in alignment with said pivot and intermediate said switches and selectively operable to engage both switch operators simultaneously to move both thereof to said second position; and a contact strip extending along said flare lever parallel to the latter's direction of reciprocation, and selectively engageable with first, second and third aligned contacts, said strip normally interconnecting said first and second contacts and, in the selectively operated position of said flare lever, interconnecting only said second and third contacts; said first contact being connected in parallel to the second pair of contacts of one switch and to said flasher main contact in series with the relay operating coil, said second contact being connected to the second pair of contacts of the other switch, and said third contact being connected to said relay front contact; whereby, when said selector lever is selectively operated, the signal lamps on one side of the vehicle will be flashed through said flasher main contact and, when said flare lever is selectively operated, the signal lamps on one side of the vehicle will be flashed through said flasher main contact and the signal lamps on the other side of the vehicle will be flashed through said flasher back contact in alternation with the lamps on such one side; said pilot lamp being flashed, whenever the selector lever is operated, in synchronism with the signal lamps and being flashed, whenever the flare lever is operated, in synchronism with the signal lamps on one side only of the vehicle.

6. A motor vehicle signalling control comprising a pair of switches mounted in spaced relation to each other, each switch including a first pair of contacts each connectible to a signal lamp on one side of the vehicle, a second pair of contacts, and an operator normally engaged with said first pair of contacts and movable to a second position interconnecting each of the first pair of contacts to a corresponding contact of the second pair; a flasher connected to the vehicle electric energy source having a main, normally open contact and a normally closed auxiliary back contact; a relay associated with said flasher and operable when said main contact is closed, said relay having an armature and a front contact normally disengaged by said armature; a grounded indictor lamp connected to said front contact; means connecting said armature to said main contact; a selector lever swingably mounted on a pivot intermediate said switches and including an operating handle and a head having camming surfaces selectively engageable with either switch operator to move the same to said second position; a flare lever mounted for reciprocation in alignment with said pivot and intermediate said switches and including a head having camming surfaces aligned with said operators, said flare lever being selectively operable to engage both its camming surfaces simultaneously with said operators to move both operators to said second position; and a contact strip extending along said flare lever parallel to the latter's direction of reciprocation, and selectively engageable with first, second and third aligned contacts, said strip normally interconnecting said first and second contacts and, in the selectively operated position of said flare lever, interconnecting only said second and third contacts; said first contact being connected in parallel to the second pair of contacts of one switch and to said main flasher contact in series with the relay operating coil, said second contact being connected to the second pair of contacts of the other switch, and said third contact being connected to said relay front contact; whereby, when said selector lever is selectively operated, the signal lamps on one side of the vehicle will be flashed through said flasher main contact and, when said flare lever is selectively operated, the signal lamps on one side of the vehicle will be flashed through said flasher main contact and the signal lamps on the other side of the vehicle will be flashed through said flasher back contact in alternation with the lamps on such one side; said pilot lamp being flashed, whenever the selector lever is operated, in synchronism with the signal lamps and being flashed, whenever the flare lever is operated, in synchronism with the signal lamps on one side only of the vehicle.

7. A motor vehicle signallying control comprising a pair of switches mounted in spaced relation to each other, each switch including a first pair of contacts respectively connected to a front and a rear marker lamp on one side of the vehicle, a second pair of contacts, a third pair of contacts respectively connected to a head lamp control switch and a brake operated switch and an operator normally engaged with said first and third pairs of contacts and movable to a second position interconnecting each of the first pair of contacts to a corresponding contact of the second pair; a flasher connected to the vehicle electric energy source having a main, normally open contact and a normally closed auxiliary back contact; a relay associated with said flasher and operable when said main contact is closed, said relay having an armature and a front contact normally disengaged by said armature; a grounded indicator lamp connected to said front contact; means connecting said armature to said flasher main contact; a selector lever movably mounted between said switches and operable to selectively engage either switch operator to move the same to said second position; a flare lever movably mounted between said switches and selectively operable to engage both switch operators simultaneously to move both thereof to said second position; and switch means associated with and operable by said flare lever and connected to each of said second pairs of contacts, said flasher main contact in series with the operating coil of said relay and to said flasher back contact; said switch means, in the non-operated position of said flare lever, connecting both of said second pairs of contacts to said flasher main contact and, in the selectively operated position of said flare lever, connecting one pair of second contacts to said flasher main contact and the other pair of second contacts to said flasher back contact; whereby, when said selector lever is selectively operated, the signal lamps on one side of the vehicle will be flashed through said main flasher contact and when said flare lever is selectively operated, the signal lamps on one side of the vehicle will be flashed through said main flasher contact and the signal lamps on the other side of the vehicle will be flashed through said flasher back contact in alternation with the lamps on such one side; said pilot lamp being flashed, whenever the selector lever is operated, in synchronism with the signal lamps and being flashed, whenever the flare lever is operated, in synchronism with the signal lamps on one side only of the vehicle, said first named switches, in the non-operated positions of both levers, connecting the front lamps to the head lamp control switch and the rear lamps to the brake operated switch.

JESSE R. HOLLINS.

References Cited in the file of this patent

UNITED STATES PATENTS

| Number | Name | Date |
|---|---|---|
| 2,090,332 | O'Neil | Aug. 17, 1937 |
| 2,514,604 | Hollins | July 11, 1950 |
| 2,562,274 | Hollins | July 11, 1951 |
| 2,562,275 | Hollins | July 31, 1951 |